Aug. 5, 1952 D. O. McCOY 2,606,287

LINEAR SWEEP GENERATOR

Filed April 10, 1950 2 SHEETS—SHEET 1

INVENTOR.
DAVID O. McCOY
BY
Marvin Moody
ATTORNEY

Aug. 5, 1952 D. O. McCOY 2,606,287

LINEAR SWEEP GENERATOR

Filed April 10, 1950 2 SHEETS—SHEET 2

INVENTOR.
DAVID O. McCOY
BY Marvin Moody
ATTORNEY

Patented Aug. 5, 1952 2,606,287

UNITED STATES PATENT OFFICE 2,606,287

LINEAR SWEEP GENERATOR

David O. McCoy, Cedar Rapids, Iowa, assignor to Collins Radio Company, Cedar Rapids, Iowa, a corporation of Iowa Application April 10, 1950, Serial No. 154,910

5 Claims. (Cl. 250—27)

This invention relates in general to apparatus for obtaining a linear sweep voltage.

In the field of electronics it often becomes necessary to develop a voltage or current which increases linearly from zero to a predetermined value and then quickly falls to zero until another saw-tooth pulse is desired. A cathode ray oscilloscope, for example, requires that a linear signal be applied to one pair of plates to obtain a trace illustrating the variation, with respect to time, of another signal which is applied to another pair of plates. Earlier circuits for obtaining a "linear" sweep consisted of apparatus for applying a voltage to a condenser and then discharging it. The discharge of a condenser results in an exponential variation of voltage. More accurate circuits were developed for straightening out the exponential characteristic of a discharging condenser. The present invention relates to an improved linear sweep generator.

An object of this invention is to provide a sweep generator which will give a linear output.

A further object of this invention is to provide a linear sweep generator which has a quick recovery time, making it possible for a fast repetitive rate of actuating signals.

A feature of this invention is found in the provision for an improved boot-strap sweep generator which receives charging current for a condenser from a cathode follower.

Further objects, features, and advantages of this invention will become apparent from the following description and claims when read in view of the drawings, in which;

Figure 3:
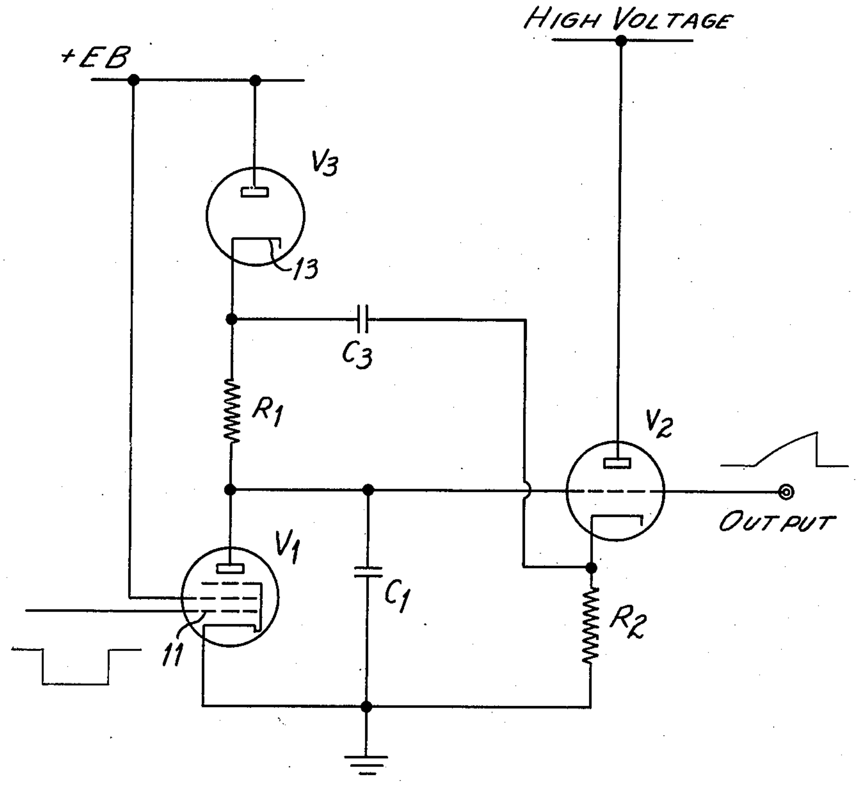
Figure 3 is a circuit diagram of a conventional boot-strap generator.

Figure 3 illustrates a conventional boot-strap linear sweep generator which comprises the pentode tube $V_1$, the cathode follower $V_2$ and the diode $V_3$. A condenser $C_1$ is a relatively small one and the condenser $C_3$ is a relatively large one, for example, 1000 and 10,000 micromicrofarad, respectively. Tube $V_1$ has a control grid 11 to which is supplied a negative gate when a linear sweep is desired. Before the gate is supplied to the grid 11, tube $V_1$ is in a conducting state and current flows through the diode $V_3$, the resistor $R_1$, and the tube $V_1$, thus charging the condenser $C_3$ to a potential approximately equal to $E_B$. The condenser $C_1$ is substantially discharged during this period because of the low voltage drop across $V_1$. If a negative pulse having a time duration equal to the length of the desired sweep is supplied to the grid 11, the tube $V_1$ will be driven to cutoff, and the current previously flowing through $V_1$ from $E_B$ will flow to the condenser $C_1$ to charge it. If the upper end of the resistor $R_1$ remains fixed in voltage the current through it will decay exponentially and the sweep voltage developed across $C_1$ would approach $E_B$ exponentially. In this circuit, however, the upper end of $R_1$ is carried upward in voltage by the cathode follower $V_2$ through the coupling condenser $C_3$ with essentially the same rate of change as that of the plate of the tube $V_1$. This maintains the voltage across $R_1$, and, therefore, the current through $R_1$ essentially constant. The charging current flowing into $C_1$ is also essentially constant and therefore the rate of change of voltage across $C_1$ is essentially constant. This results in an output across the condenser $C_1$ which is substantially linear.

The realization of a linear sweep, however, in the above described circuit is only approximate because the voltage across $R_1$ does not remain constant but reduces during the sweep for the following reasons:

1. The cathode follower $V_2$ does not have a gain of one.
2. The ratio of maximum to minimum voltage across $R_2$, the cathode resistor of $V_2$, requires a large variation in cathode current with the associated large variation in grid voltage requirement.
3. The tube $V_2$ must operate near cutoff in the non-linear portion of the curve.
4. The current flowing through $R_1$ during the sweep stroke must be supplied from the condenser $C_3$ because the diode $V_3$ is non-conducting during this interval of time.

The above factors result in some shrinkage of the voltage across $R_1$ causing a consequent non-linear sweep. In spite of this disadvantage, the circuit produces a sweep output that is far more linear and has a far wider voltage excursion than can be produced by any other previously known circuit.

The recovery of the circuit presents a problem. At the end of the sweep stroke the voltage applied to the grid of $V_1$ reduces to zero and this tube becomes conducting, thus resulting in a rapid discharge of the condenser $C_1$. $C_1$ may be a relatively small condenser and the quick discharge is desirable. $C_3$, on the other hand, is a relatively large capacitor being in the order of ten times the value of $C_1$, and it must be recharged by the forward resistance of the diode $V_3$ in series with the cathode resistor $R_2$. The diode $V_3$ has a very low forward resistance, but the cathode resistor $R_2$ is usually large to minimize the slide-back characteristic of the cathode follower. Thus the time required to charge condenser $C_3$ is relatively long, which means that the sweep cycle must be initiated again after a relatively long time. This is a disadvantage.

Figure 1:
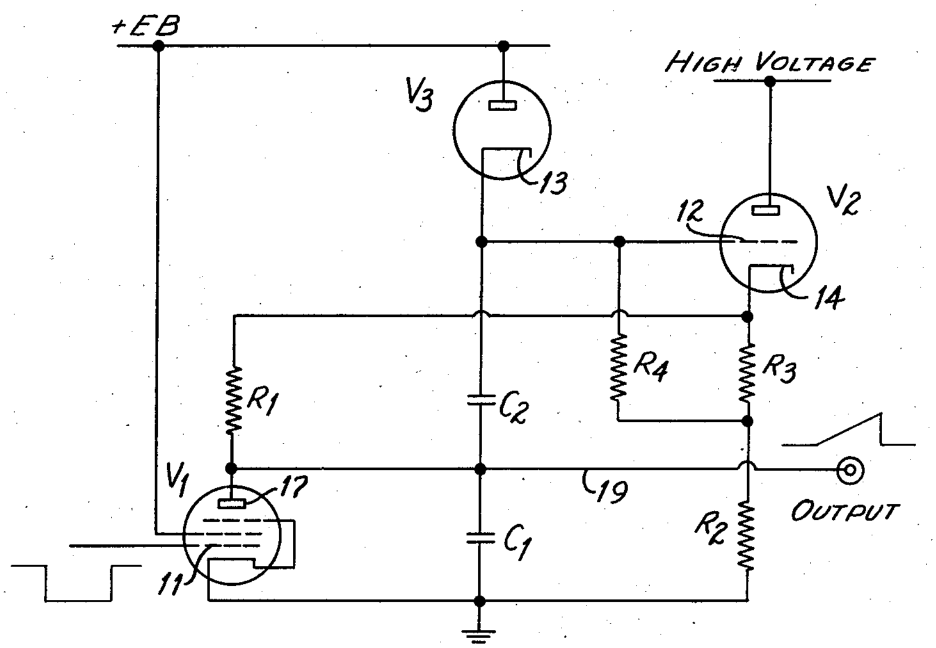
Figure 1 is a drawing of the improved boot-strap generator of this invention.

Figure 1 illustrates the basic circuit of applicant's invention. It is to be noted that the cathode follower $V_2$ has its grid 12 connected to the cathode 13 of $V_3$. The cathode 14 of the cathode follower is operated with a high initial voltage and the grid 12 of the tube is connected to the cathode through the resistors $R_3$ and $R_4$. The upper end of the resistance $R_4$ has been connected to the cathode 13 of $V_3$. The condensers $C_2$ and $C_1$ are connected in series between the diode $V_3$ and ground. This circuit allows the grid 12 of the cathode follower $V_2$ to be controlled by the plate 17 of $V_1$ through the condenser $C_2$ rather than by direct coupling as in the circuit of Figure 3. The current supply for the resistance $R_1$ will now be supplied from the cathode follower, and thus a large current drain on $C_2$ is eliminated.

$C_2$ may have a relatively small value. During the recovery of the circuit the condenser $C_1$ is discharged by $V_1$. Condenser $C_2$ is recharged by the forward resistance of the diode $V_3$ and the plate resistance of $V_1$. Because of the relatively low value of the capacitance of $C_2$, the recovery time of the circuit will be relatively short.

The higher quiescent voltage across the resistor $R_2$ of $V_2$ results in higher gain and improved linearity of the output.

A lead 19 is connected to the plate 17 of $V_1$ and furnishes the linear output.

Examples of possible values of components of the circuits are:

| | | |
|---|---|---|
| $R_1$ | megohm | 1 |
| $R_2$ | ohms | 47,000 |
| $R_3$ | do | 2200 |
| $R_4$ | meghom | 1 |
| $R_5$ | ohms | 200 |
| $C_1$ | micromicrofarads | 1000 |
| $C_2$ | do | 1000 |
| $C_3$ | do | 10000 |

$V_1$ and $V_4$ may be tube type 6AK5, $V_2$ may be a 2C51, and $V_3$ may be a 6AL5.

Figure 2:
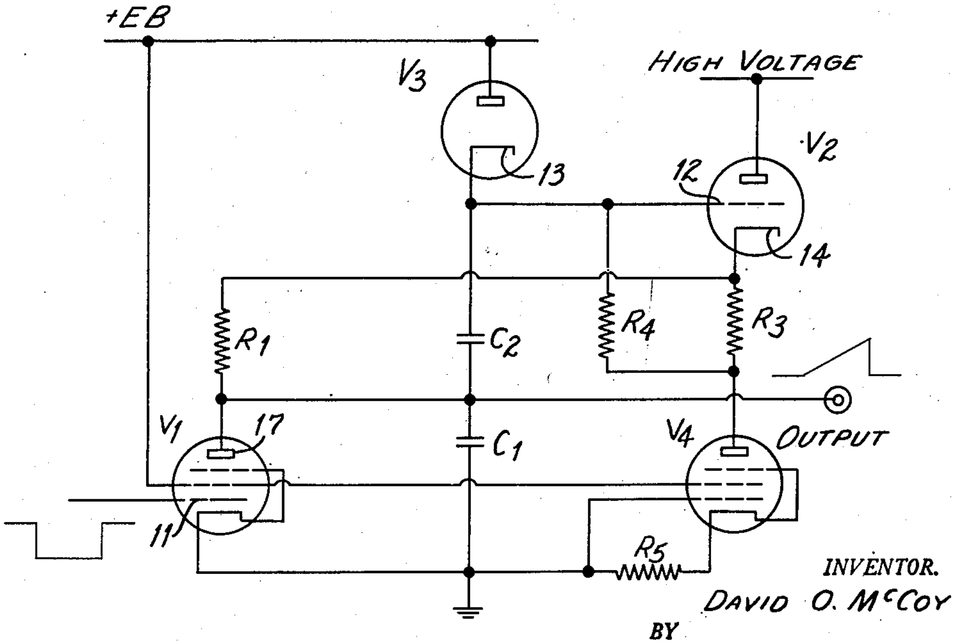
Figure 2 is a modification of the improved sweep generator of this invention.

A modification of this invention is illustrated in Figure 2 wherein the cathode resistor $R_2$ is replaced by a pentode tube $V_4$. Since a pentode tube is essentially a constant current device, it is ideal for this application.

It is seen that this invention relates to a linear sweep device which has a rapid recovery time.

Although this invention has been described with respect to particular embodiments thereof, it is not to be so limited as changes and modifications may be made therein which are within the full intended scope, as defined by the appended

I claim:

1. A circuit for obtaining a linear sweep voltage, comprising a first tube having a control grid which receives negative gates for driving the tube to cutoff, a resistor connected to the plate of said first tube, a cathode follower tube with its cathode connected to the opposite side of said resistor, a first capacitor connected between the plate and cathode of said first tube, a third tube of the diode type with its plate connected to a positive voltage source and its cathode connected to the control grid of the cathode follower tube, a second condenser connected between the cathode of said third tube and plate of said first tube, a second resistor connected to the grid of said cathode follower tube, a third resistor connected between the cathode of the cathode follower tube and the second resistor, a fourth resistor connected between ground and said second and third resistors, and an output taken from the plate of said first tube.

2. A system according to claim 1 wherein the plate of said cathode follower tube is connected to a high voltage source.

3. Means for obtaining a linear sweep signal, comprising a first electronic valve normally in the conducting state and driven to cutoff in response to negative control pulses received on its control grid, a first condenser connected between the plate and cathode of said first electronic valve, a second condenser connected to the first condenser, a second electronic one-way valve connected with its plate to a positive voltage source and its cathode connected to the second condenser, a cathode follower with its grid connected to the cathode of the second electronic valve, biasing means for the grid of the cathode follower, a first resistor connected between the plate of the first electronic valve and the cathode of the cathode follower, and output means connected to the plate of the first electronic valve.

4. Means for producing a linear sweep voltage, comprising a first electronic valve, a first resistor, a second electronic valve of the cathode follower type, said first electronic valve, first resistor, and second electronic valve connected in series between ground and a high potential with the plate of the second electronic valve connected to the high voltage side, a third electronic valve, a first capacitive means, a second capacitive means, with the third electronic valve and first and second capacitive means connected in series between a high potential and ground, the cathode of said third electronic valve connected to the grid of said second electronic valve, and output means connected to the plate of said first electronic valve to furnish a linear sweep voltage in response to negative pulses fed to the control grid of said first electronic valve.

5. A circuit for obtaining a linear sweep voltage comprising, a first tube having a control grid which receives negative pulses for driving the tube to cutoff, a second electronic valve of the cathode follower type with its plate connected to a high voltage supply, a first resistor connected between the plate of said first electronic valve and the cathode of said second electronic valve, first capacitive means connected between the plate of the first electronic valve and ground, a third electronic valve with its plate connected to a high potential source and its cathode connected to the control grid of said second electronic valve, second capacitive means connected between the cathode of said third electronic valve and said first capacitive means, a fourth electronic valve of the constant current type with its plate connected to the cathode of the second electronic valve through a second resistance, and third resistive means connected between the grid of the second electronic valve and the plate of the fourth electronic valve, and output means connected to the plate of said first electronic valve.

DAVID O. McCOY.

REFERENCES CITED

The following references are of record in the file of this patent:

UNITED STATES PATENTS

| Number | Name | Date |
|---|---|---|
| 2,426,256 | Zenor | Aug. 26, 1947 |
| 2,439,324 | Walker | Apr. 6, 1948 |
| 2,532,534 | Bell | Dec. 5, 1950 |